United States Patent Office 3,360,278
Patented Dec. 26, 1967

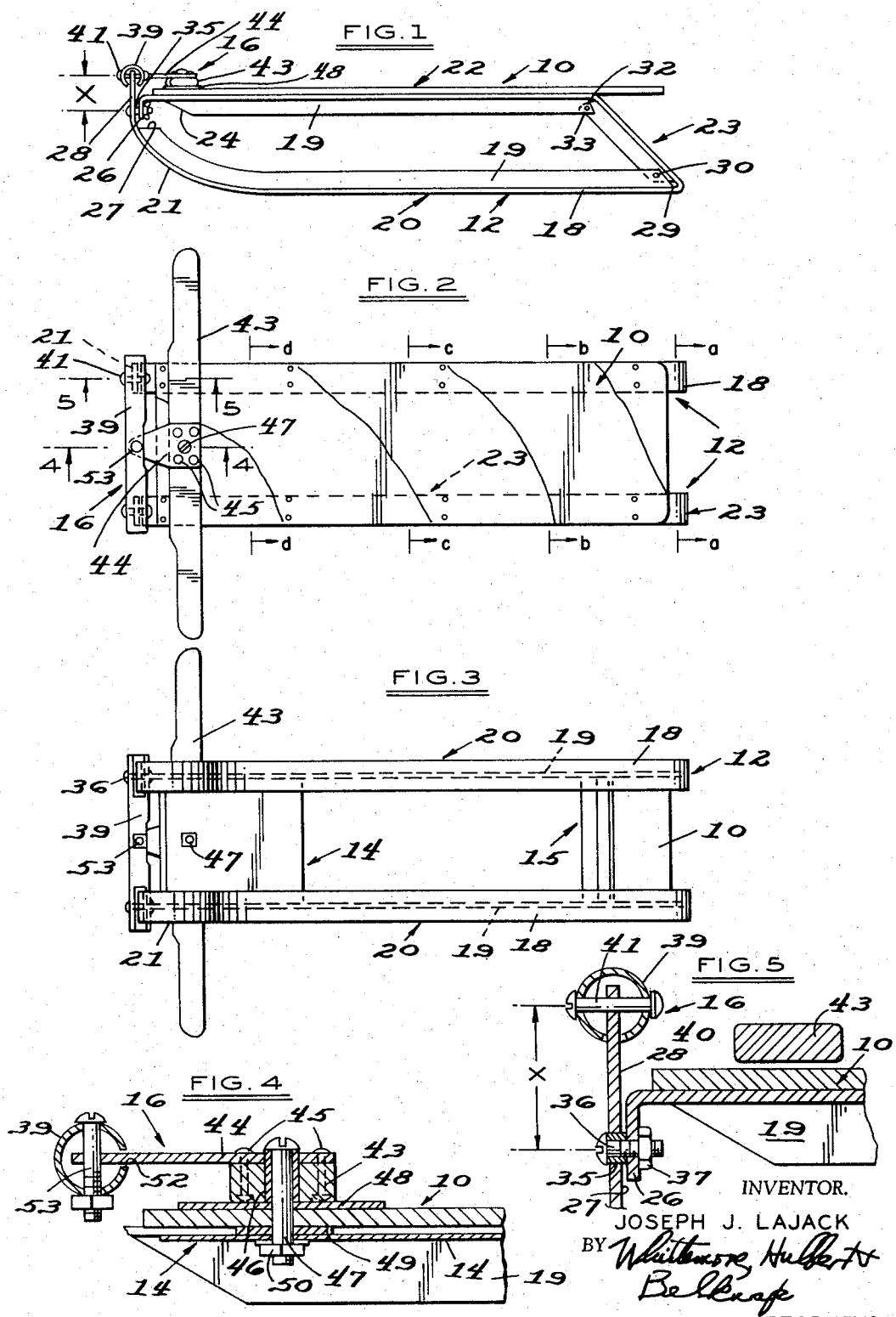

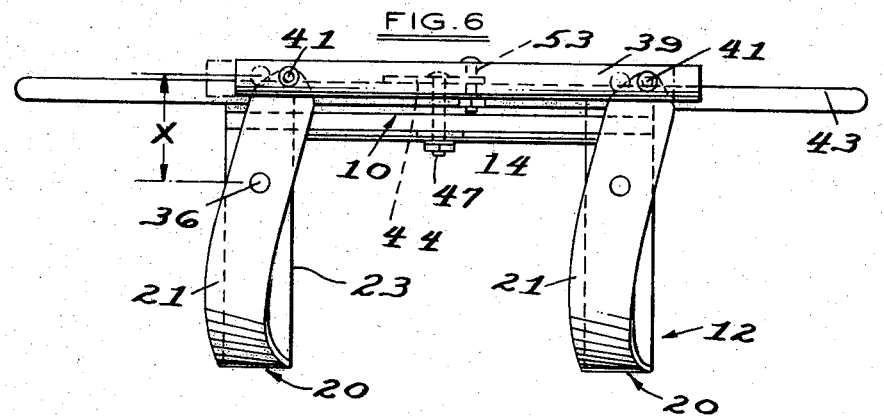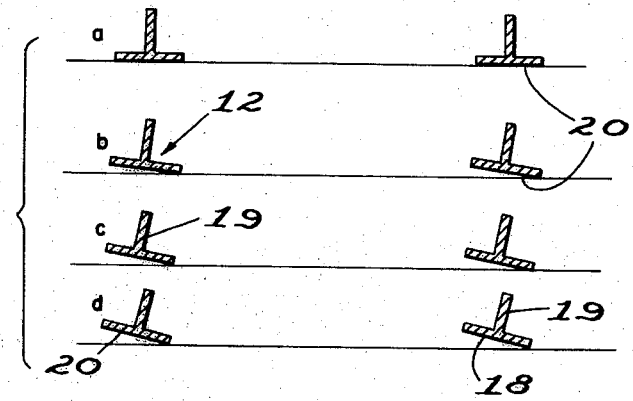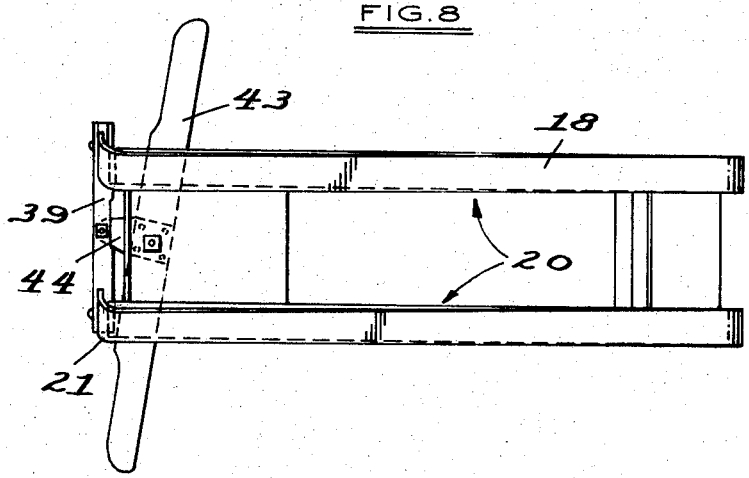

3,360,278
SNOW SLED
Joseph J. Lajack, 3446 Berkshire, Warren, Mich. 48091
Filed Sept. 27, 1965, Ser. No. 490,321
10 Claims. (Cl. 280—21)

ABSTRACT OF THE DISCLOSURE

A sled is disclosed having a pair of runner units, each of one-piece construction and including a wide and flat runner portion, a deck-supporting frame portion and a rear portion integrally connecting the runner and frame portions to one another, with the runner and frame portions connected together adjacent the front of the sled by horizontal axis swivel means. A steering device is journalled on an upright axis on the sled deck, and includes a forward, transversely disposed thrust rod connected at its opposite ends to the runner portions of the runner unit, at points substantially above the responsive swivel connections of those portions and the respective frame portions. This affords a substantial moment arm or mechanical advantage in the application of steering effort to the runner units.

The runner units have rigid connections to the deck rearwardly of the steering structure, with the effect that the application of transverse steering thrust to the runners causes the latter to be given a substantial and rearwardly diminishing twist between the forward steering zone and the zone at which the runners are rigidly connected to the deck.

---

The present invention relates to a snow sled having greatly improved and highly desirable steering qualities, as compared with sleds presently on the market, as well as improved simplicity and ruggedness. More particularly, the arrangements and operation in steering involve a twisting or tilting of the runners of the sled on rectilinear axes through and parallel to the runners, the degree of tilt on these axes diminishing in the direction from front to rear. This causes the runners to bank into the snow, in the manner of skis, to produce the desired steering turn, rather than involving a swing of the fronts of the runners in a horizontal plane, as in conventional steering sleds.

Further in accordance with the invention, the runners are much wider than in the usual sled, being of the order of, say, up to two inches wide. This causes them to coast or glide over the surface of the snow, rather than knifing through it, as a narrow runner will. The coasting quality, as well as the quality of steering effect, is enhanced accordingly.

Another object of the invention is to provide a wide runner sled as described, in which the runners are reinforced by longitudinally extending central flanges above their coasting surfaces, and are integral parts of a frame structure which also directly supports the sled's deck. This structure rigidifies and strengthens the sled, without need for the usual upright side bracing legs or struts to connect the runners to the deck; and also makes possible the progressive, rearwardly diminishing banking twist or tilt of the runners. The twist or tilt is at a maximum where the runners encounter the snow and zero at the rear of the combined runner-frame structure, where they rest flatwise upon the snow.

It is another object of the invention to provide a steering sled which is strengthened basically by a one-piece steering runner and frame construction as described, and otherwise only by appropriate reinforcing plate means at the top of the sled. Being thus free of the usual upright runner legs, the improved sled is not subject to the drag occasioned by such legs or struts in passing through the snow.

With the objectives of the three preceding paragraphs in mind, each of the runners may consist of a single length of metal rolled, drawn or extruded in a T-shaped cross section, which may be readily and inexpensively shaped by cutting and bending operations, to be described, to provide unitary frame and runner forms having top horizontal, deck-supporting frame portions paralleling the runner portions of the combined structure, adjacent forward ends of each pair of these frame and runner portions being united by an improved steering assembly.

A further object of the invention is to provide a sled having such an improved steering assembly which, as connected to the frame-runner units, includes a horizontal, transversely extending and acting thrust rod that is operated directly from a steering bar medially pivoted on the deck structure of the sled. The ends of the thrust rod are operatively connected on horizontal pivots to the tops of the two upwardly curved runner portions and, at a lower point, to each of the pair of runner and frame portions; and these operating connections produce the desired tilting action for bank-type steering.

Moreover, the vertical distance from the top pivotal runner connections of the thrust rod down to its pivotal runner and frame connections is substantial. Thus transverse shifting action imparted to the thrust rod upon the swing steering bar has the assistance of a substantial mechanical advantage to exert the desired twisting or tilting effect on the forward ends of the runners.

The foregoing as well as other objects will become more apparent as this description proceeds, especially when considered in connection with the accompanying drawings illustrating the invention, wherein:

FIG. 1 is a side elevational view of the improved sled;

FIG. 2 is a top plan view of the sled, illustrating in solid and dot-dash lines the limited motion of the thrust rod and steering bar in use;

FIG. 3 is a bottom plan view of the sled, more clearly illustrating the relatively wide nature of the reinforced flanged runners thereof;

FIGS. 4 and 5 are fragmentary, enlarged scale views in vertical section along lines 4—4 and 5—5 of FIG. 2, respectively, showing the operative connections of the pivoted steering bar of the steering assembly to the thrust rod of the latter, and of the thrust rod to one of the runners;

FIG. 6 is an enlarged scale front elevational view illustrating in solid line the twisting or tilting action of the runners for banking or steering, the normal straightaway position being indicated in dotted line;

FIG. 7 is a combined schematic view illustrating the progressively increasing twist of the runners in steering, the sequence of section being along lines a—a, b—b, c—c and d—d of FIG. 2; and FIG. 8 is a bottom view further illustrating the runners in a twisted position in steering.

The sled of the invention is basically comprised of a top horizontal body panel or deck 10, which may be in the form of a generally rectangular piece of plywood, plastic or the like; a pair of identical, combined, one-piece frame and runner units 12; reinforcing means in the form of a forward sheet metal strengthening and rigidifying plate 14 and rear bracing angle piece 15, both mounted directly beneath the deck to extend between the flanges of units 12; and a steering assembly which is generally designated by the reference numeral 16.

The runners 12 are each formed of a single length of relatively rigid rollers strap metal, rolled, drawn or extruded in a T-shaped cross section, presenting a wide flat foot 18 strongly reinforced by a 90° flange 19 running lengthwise along the center thereof. As fabricated from such stock in the manner contemplated by the invention, each runner has a side outline resembling a parallelogram (FIG. 1), including a bottom runner portion 20 proper which is forwardly curved upwardly at 21; an upper deck support or frame portion 22 paralleling the runner portion 20 at a suitable elevation thereabove, for example, seven or eight inches for a sled of about forty inch length, and a forwardly and upwardly angled rear connecting portion 23.

As illustrated in FIG. 2, the medial flange 19 of the upper, deck support portion 22 of each runner unit 12 is cut back at 24, leaving a forward, unflanged end, which is bent downwardly 90° to provide a fulcrum ear 26 for a purpose to be described. Directly beneath this ear, the vertically aligned runner portion at 21 also has a cut-back 27 and is bent upright in an upwardly projecting, unflanged tongue 28, at which steering thrust is applied to the runner portions 20 in a way to be described.

In forming the member 12 from the T-section material, the flange 19 thereof is given a V cut at 29, permitting it to be bent upward in excess of 90°, whereupon overlapped portions of the flange 19 are drilled and riveted together at 30. Similarly, the flange, where the portions 22 and 23 join, is given a saw cut at 32, permitting a less than 90° bend between portions 22, 23, whereupon the overlapped flange parts are drilled and riveted together at 33 to complete the rear outline of the runner and frame unit 12. It will be observed that the runner structure is strongly braced by the flanging of its wide horizontal surfaces, without resort to the use of upright braces, legs or struts such as have been found necessary in a conventional sled, and such as cause retarding drag through the snow. Yet the runner portions 20, proper, have adequate flexibility diminishing from front to rear thereof to permit the desired banking and steering tilt or twist.

The rear bracing angle 15 is disposed between the flanges 19 of the respective frame portions or sections 22 of runners 12, adjacent the junction of these sections with inclined rear portion 23; and angle 15 is strongly secured by a pair of screws at each end to the portions 22 and 23. The rectangular sheet metal rigidifying plate 14 is similarly secured between the flanges 19 of the upper portion 22 of the runner-frame structures 12; and the deck 10 is downwardly secured on the horizontal surface 18 of the portion 22, as by a series of screws, bolts or rivets.

Referring to FIG. 5, the upwardly projecting forward tongues 28 of the runners are apertured just above the flange relief 27 to receive a tubular bushing 35, which in turn receives a horizontal pivot screw 36. The head of this screw engages bushing 35 slightly forwardly of the tongue 28 and its shank extends through the downturned ear 26 at the front of the upper horizontal runner portion 22, a nut 37 being threadedly applied thereto at the rear of the ear. In this fashion, each runner portion 20 has a front pivotal connection to a front of the frame portion 22 of the combined runner and frame structure 12, at the approximate ends of the single T section length of stock from which the structure is formed.

The steering assembly 16 of the sled includes a horizontally elongated, transversely acting tubular thrust rod 39, the bottom of which is centrally and vertically slotted at 40 adjacent its ends to receive the upper end of one of the upright runner tongues 28; and a screw or rivet 41 extends through aligned horizontal openings in the thrust rod 39 and tongue 28 to effect a pivotal, thrust transmitting connection of the rod to each runner. Accordingly, transverse horizontal thrust is exerted from rod to runner tongue 28 with a mechanical advantage represented by the moment arm X in FIGS. 1, 5 and 6, the vertical distance between pivotal axes at 41 and 36.

Such thrust is transmitted to rod 39 from a horizontal steering bar 43, in the usual manner. Reference being had to FIG. 4 of the drawings, this bar 43 is shown as being equipped with a forwardly projecting metal arm or lever 44, secured thereto by four screws or rivets 45. Bar 43 and lever 44 are apertured vertically to receive a tubular bushing 46, through which an upright pivot bolt 47 extends, the bushing projecting slightly above the lever and being engaged from above by the head of the bolt. Bolt 47 also passed through an upper washer 48, a center opening in the wooden deck 10, a second lower washer 49 and the reinforcing sheet metal plate 14, having a lock washer and nut 50 applied to the bottom end thereof.

As illustrated in FIG. 4, the forward end of the steering arm 44 fixed on steering bar 43 extends through a horizontal slot 52 at the center of thrust rod 39; and an upright bolt or rivet 53 passes through the rod and an opening in the end of arm 44 to afford a pivotal, thrust transmitting connection between the steering arm and rod 39.

This completes the steering assembly 16 of the sled, and it will be seen that a relatively slight steering swing of bar 43, as from the solid to the dot-dash line positions of FIG. 2, will cause a strong tilting twist action to be exerted on the runners 20 at the forward ends thereof. This action reflects a mechanical advantage represented by the ratio of length of steering bar 43 to that of steering tongue 44, and the mechanical advantage afforded by the distance X from thrust rod 39 to the pivot of the runner at screw 36. The forwardly and upwardly curved ends of the runners are canted in diminishing degree from the forward end to the rear extremity, as represented by the series of sections appearing in FIG. 7, and as are suggested in FIGS. 6 and 8. That is, the rear of the runner directly adjacent its inclined connecting portion 23 rests flat upon the snow, while the forward extremity has a maximum cant upwardly. This causes the relatively wide runner to exert a banking action on the snow in the well known manner of a ski. Yet, the runner glides in effect over the top of the snow, rather than slicing through it, and the retarding effect of the bracing legs commonly emloyed in sled constructions, in scraping through the snow, is avoided.

As indicated above, the horizontal width of the runner foot 18 may be about two inches for a sled of standard length and height, but in any event, sufficiently wide to afford the desired ski-like banking operation. In any event, its width, as best illustrated in FIGS. 3 and 7, is substantially greater than that of its central flange 19, which will be, say, of the order of ⅛–¼ inch. The bottom runner foot 18 may be grooved in a conventional manner, if desired, although the substantial width thereof gives adequate stability in steering. The height of the flange 19 may of course vary, but should be sufficient to permit the making of the overlapped connections at 30 and 33, respectively, of the runner portion 20 to the rear connecting portion 23, and of the last named portion to the upper frame portion 22.

It is to be seen that the fabrication of the runner units 12 in the manner described above, including the connections of its portions referred to above, and the common pivotal or fulcrumming connections of the opposite ends of runner portion 20 and frame portion 22, by means of the bolt or rivet 35, makes for an exceedingly inexpensive manuafcture of the sled both in regard to the material and labor costs; and the same is to be said in regard to structural details of the steering assembly 16. Yet the sled has great strength and can be fabricated to present an attractive appearance.

What I claim as my invention is:

1. A steering sled comprising a horizontal deck, a pair of runners supporting said deck, each runner including a flat runner portion of substantial horizontal width, and means connecting said runner and deck in vertically spaced relation to one another, and manually operable steering means movably mounted on said sled, said steering means having operating connections to said runners adjacent the forward ends of the latter and said runner portions having rigid connections to said deck rearwardly of said operating connections, whereby operation of the steering means produces a substantial and rearwardly diminishing twist of said runners between the respective operating and rigid connections about axes substantially paralleling the length thereof.

2. A steering sled comprising a horizontal deck, a pair of one-piece runner units connected to and supporting said deck, each unit including a flat bottom runner portion of substantial horizontal width, a deck supporting frame portion, and a rear portion integrally connecting said runner and frame portions in vertically spaced relation to one another, and manually operable steering means movably mounted on said sled, said steering means having operating connections to said runner and frame portions adjacent the forward ends of the latter and said runner units having rigid connections to said deck rearwardly of said operating connections, whereby operation of the steering means produces a substantial and rearwardly diminishing twist of said runner portions between the respective operating and rigid connections about axes substantially paralleling the length thereof.

3. A steering sled comprising a horizontal deck, a pair of one-piece runner units connected to and supporting said deck, each unit including a flat bottom runner portion of substantial horizontal width, a deck supporting frame portion, and a rear portion integrally connecting said runner and frame portions in vertically spaced relation to one another, said frame and rear portions providing substantially the sole means supporting the rear of the deck on the runner portions, and manually operable steering means movable mounted on said sled adjacent the forward end of the latter, said steering means having operating connections to said runner and frame portions adjacent the forward ends of the latter and said runner units having rigid connections to said deck rearwardly of said operating connections, whereby operation of the steering means produces a substantial twist of said runner portions about axes substantially paralleling the length thereof, the twist diminishing in degree from front to rear.

4. A sled in accordance with claim 1, in which said operating connections include, for each runner, a fulcrum connection to the deck and an operating connection between said steering means and the runner at a point spaced substantially above the fulcrum connection.

5. A sled in accordance with claim 3, in which each runner unit is provided with an integral flange projecting from its runner, frame and rear connecting portions, said frame portions with said rear portion, adjacent flange ends being overlapped and fixedly secured together at said junctions.

6. A sled in accordance with claim 3, in which each runner unit is provided with an integral flange projecting from its runner, frame and rear connecting portions, said flange being interrupted at the junctions of said runner and frame portions with said rear portion, adjacent flange ends being overlapped and fixedly secured together at said junctions, the runner and frame portions of the respective runner units being connected to one another by the operating connections of said steering means.

7. A steering sled comprising a horizontal deck, a pair of one-piece runner units connected to and supporting said deck, each unit including a flat bottom runner portion of substantial horizontal width, a deck supporting frame portion, and a rear portion integrally connecting said runner and frame portions in vertically spaced, parallel relation to one another, said frame and rear portions providing substantially the sole means supporting the rear of the deck on the runner portions, and a manually operable steering assembly movably mounted on said deck adjacent the forward end of the latter, said steering assembly including a transverse thrust rod having pivotal operating connections to the respective pairs of runner and frame portions adjacent the forward ends of the latter, and a steering bar pivotally mounted on said deck and operatively connected to said thrust rod to impart transverse endwise movement to the latter upon manual swinging movement of said bar, the operating connections of said thrust rod to said runner and frame portions including a common pivotal connection to each pair of runner and frame portions and a pivotal connection to each runner portion alone.

8. A steering sled comprising a horizontal deck, a pair of one-piece runner units connected to and supporting said deck, each unit including a flat bottom runner portion of substantial horizontal width, a deck supporting frame portion, and a rear portion integrally connecting said runner and frame portions in vertically spaced, parallel relation to one another, said frame and rear portions providing substantially the sole means supporting the rear of the deck on the runner portions, and a manually operable steering assembly movably mounted on said deck adjacent the forward end of the latter, said steering assembly including a transverse thrust rod having pivotal operating connections to the respective pairs of runner and frame portions adjacent the forward ends of the latter, and a steering bar pivotally mounted on said deck and operatively connected to said thrust rod to impart transverse endwise movement to the latter upon manual swinging movement of said bar, the operating connections of said thrust rod to said runner and frame portions including a common pivotal connection to each pair of runner and frame portions and a pivotal connection to each runner portion along which is spaced substantially above said common connection, whereby operation of the steering assembly produces a substantial twist of said runner portions, diminishing in degree from front to rear of the latter, under a mechanical advantage contributed by the spacing of said last named pivotal connections.

9. A steering sled comprising a horizontal deck, a pair of one-piece runner units connected to and supporting said deck, each unit including a flat bottom runner portion of substantial horizontal width, a deck supporting frame portion, and a rear portion connecting said runner and frame portions in vertically spaced relation to one another, and manually operable steering means movably mounted on said sled, said steering means having operating connections to said runner and frame portions adjacent the forward ends of the latter, whereby operation of the steering means produces a substantial twist of said runner portions about axes substantially paralleling the length thereof, said operating connections including, for each pair of runner and frame portions, a fulcrum connection of those portions to one another and an operating connection between said steering means and the runner portion alone at a point spaced substantially above the fulcrum connection.

10. A steering sled comprising a horizontal deck, a pair of one-piece runner units connected to said supporting said deck, each unit including a flat bottom runner portion of substantial horizontal width, a deck supporting frame portion, and a rear portion connecting said runner and frame portions in vertically spaced relation to one another, said frame and rear portions providing substantially the sole means supporting the deck on the runner portions, and manually operable steering means movably mounted on said sled adjacent the forward end of the latter, said steering means having operating connections to said runner and frame portions adjacent the forward ends of the latter, whereby operation of the steering means produces a substantial twist of said runner portions about axes substantially paralleling the length thereof, the twist diminishing in degree from front to rear, said operating connections including, for each pair of runner and frame portions, a fulcrum connection of those portions to one another and an operating connection between said steering means and the runner portion alone at a point spaced substantially above the fulcrum connection.

References Cited

UNITED STATES PATENTS

| | | | |
|---|---|---|---|
| 1,888,857 | 11/1932 | Greene | 280—21 |
| 2,026,440 | 12/1935 | Scholtes | 280—21 XR |
| 2,317,048 | 4/1923 | Foshak | 280—21 |

BENJAMIN HERSH, *Primary Examiner.*

L. D. MORRIS, *Assistant Examiner.*